(12) United States Patent
Akae

(10) Patent No.: US 10,796,466 B2
(45) Date of Patent: Oct. 6, 2020

(54) GRAPH DRAWING METHOD, GRAPH DRAWING SYSTEM, SERVER APPARATUS, GRAPH DRAWING APPARATUS, AND RECORDING MEDIUM

(71) Applicant: CASIO COMPUTER CO., LTD., Tokyo (JP)

(72) Inventor: Naoki Akae, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/386,988

(22) Filed: Apr. 17, 2019

(65) Prior Publication Data

US 2019/0318518 A1 Oct. 17, 2019

(30) Foreign Application Priority Data

Apr. 17, 2018 (JP) .................................. 2018-079445

(51) Int. Cl.
*G06T 11/20* (2006.01)
(52) U.S. Cl.
CPC .................................. *G06T 11/206* (2013.01)
(58) Field of Classification Search
None
See application file for complete search history.

(56) References Cited

U.S. PATENT DOCUMENTS

2011/0227946 A1* 9/2011 Yoshizawa ............. G06F 15/02
345/636

FOREIGN PATENT DOCUMENTS

| JP | H07-049955 A | 2/1995 |
| JP | H11-161612 A | 6/1999 |
| JP | 2010-014858 A | 1/2010 |

OTHER PUBLICATIONS

"Fx-CG50 (Version 3.20) Software User's Guide", 2017, retrieved from the Internet at: https://support.casio.com/en/manual/004/fx-CG50_Soft_v320_EN.pdf on Mar. 7, 2019.

* cited by examiner

*Primary Examiner* — Nicholas R Wilson
(74) *Attorney, Agent, or Firm* — Scully Scott Murphy & Presser

(57) ABSTRACT

A method executed by a graph drawing system includes specifying minimum and maximum values of a drawing area in a first axis and a display pixel width along the first axis, determining a step width of a numerical value of the first axis based on a coordinate width along the first axis and the specified display pixel width, the coordinate width being obtained based on the specified minimum and maximum values, changing the minimum or maximum value based on the determined step width and the minimum or maximum value, and determining, based on at least the changed minimum or maximum value, the determined step width and a mathematical expression, coordinates of plot points of the graph, the coordinates including numerical values of variables.

13 Claims, 11 Drawing Sheets

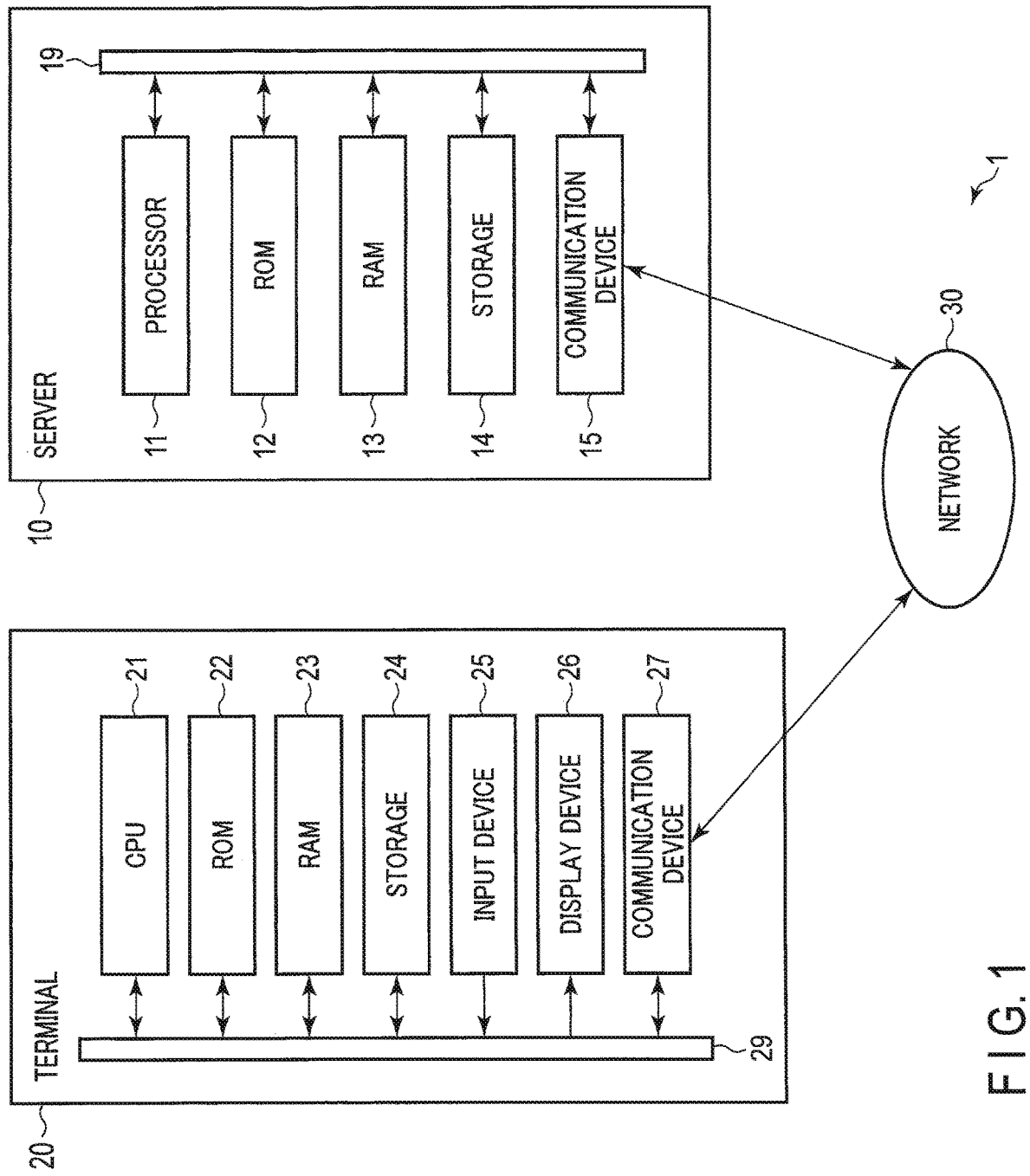
F I G. 1

|  | CONVENTIONAL METHOD | | PRESENT EMBODIMENT | |
| --- | --- | --- | --- | --- |
|  | xmin/xmax | xdot | xstart/xend | xstep |
| TRANSLATION OF GRAPH AREA | ○ | × | ○ | × |
| GRAPH AREA ZOOM | ○ | ○ | ○ | ○ |
| CHANGE OF SIZE OF GRAPH TAG | ○ | × | ○ | × |
| CHANGE OF WINDOW SIZE | — | — | ○ | ○ |

FIG. 10

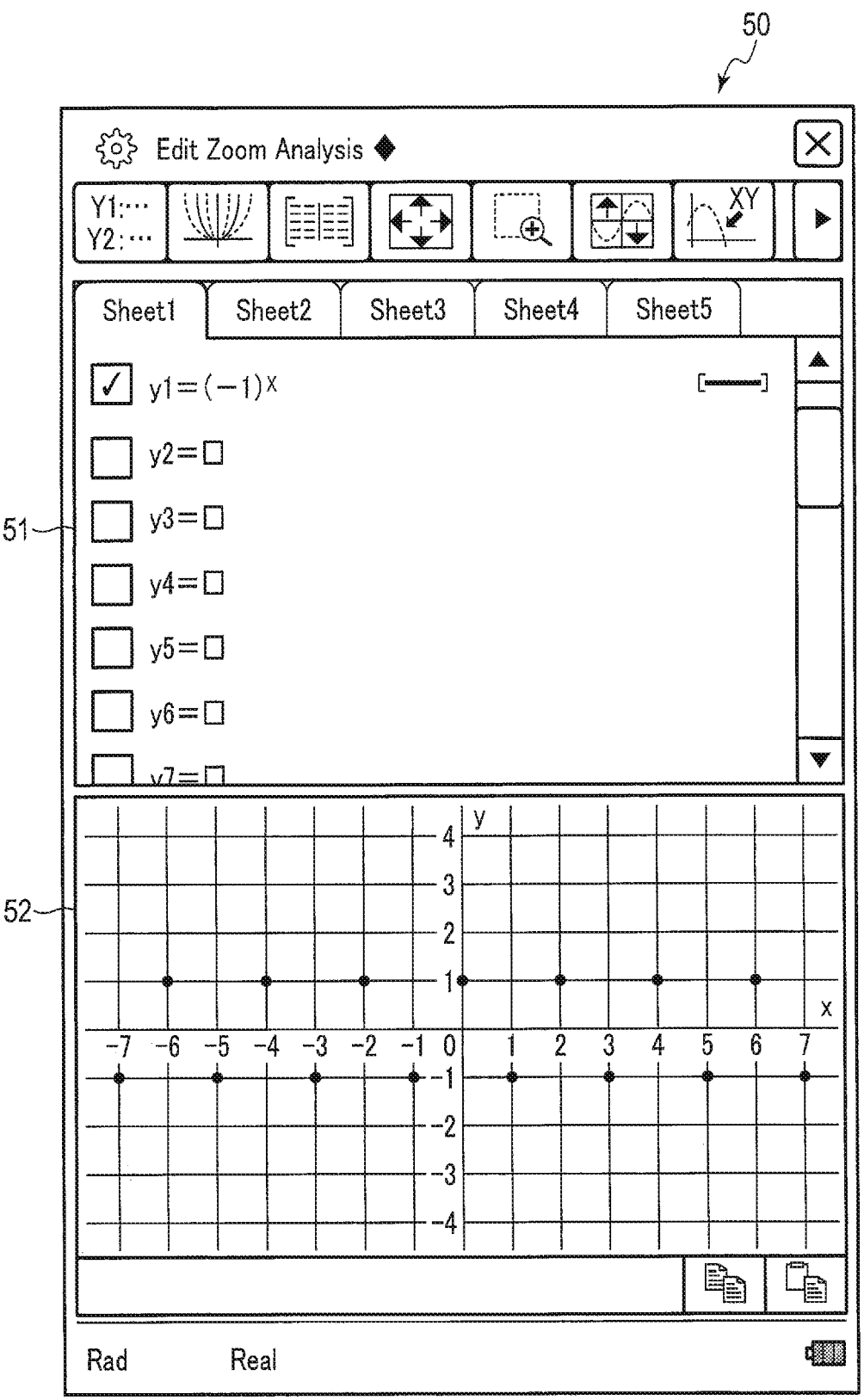
F I G. 12

GRAPH DRAWING METHOD, GRAPH DRAWING SYSTEM, SERVER APPARATUS, GRAPH DRAWING APPARATUS, AND RECORDING MEDIUM

CROSS-REFERENCE TO RELATED APPLICATION

This application is based upon and claims the benefit of priority from the prior Japanese Patent Application No. 2018-079445, filed Apr. 17, 2018, the entire contents of which are incorporated herein by reference.

BACKGROUND

1. Technical Field

The technical field relates to a graph drawing method, a graph drawing system, a server apparatus, a graph drawing apparatus, and a recording medium.

2. Description of Related Art

There is known a graphing scientific calculator which can execute graph drawing based on a function, such as electronic calculator fx-CG50 manufactured by CASIO COMPUTER, CO., LTD., the instruction manual of which is published on the Internet (Software Version 3.20 User's Guide, searched on the internet at Mar. 7, 2019: 'https://support.casio.com/en/manual/004/fx-CG50_Soft_v32 0_EN.pdf').

For example, an x-th power of a negative integer, such as a function $y=(-1)^x$, has a value only when x is an integer. In a graphing scientific calculator or a graph drawing application, in order to correctly display a graph of such a function, it is necessary that the value of y be calculated with respect to an arbitrary integer of x in a coordinate range in which a graph is drawn. The object of the present invention is to determine coordinate values such that a first variable of a function takes an arbitrary integer value in a coordinate range in which a graph is drawn.

BRIEF SUMMARY

According to a first aspect of embodiments, there is provided a method executed by a graph drawing system including a plurality of apparatuses which are mutually communicably connected via a network, the method comprising executing the following, for determining a plurality of coordinates of a plurality of plot points of a graph corresponding to a mathematical expression including a plurality of variables, the coordinates being determined for drawing the graph on a drawing area in a screen of a display, the drawing area being defined by a plurality of coordinate ranges corresponding to a plurality of axes corresponding to the variables: specifying a minimum value and a maximum value of the drawing area in the screen of the display in a first axis of the plurality of axes, and a display pixel width along the first axis of the drawing area of the display; determining a step width of a numerical value of the first axis, based on a coordinate width along the first axis of the drawing area, and the specified display pixel width along the first axis, the coordinate width being obtained based on the specified minimum value and the specified maximum value; changing the minimum value or the maximum value of the coordinate range of the first axis of the drawing area, based on the determined step width of the numerical value of the first axis, and the minimum value or the maximum value of the coordinate range of the first axis of the drawing area; and determining, based on at least the changed minimum value or the changed maximum value of the coordinate range of the first axis, the determined step width of the numerical value of the first axis and the mathematical expression, the plurality of coordinates of the plot points of the graph, the coordinates including numerical values of the variables.

According to a second aspect of embodiments, there is provided a graph drawing system including a plurality of apparatuses which are mutually communicably connected via a network, the graph drawing system comprising a plurality of processors each of which is included in any one of the plurality of apparatuses and which are configured to execute the following, for determining a plurality of coordinates of a plurality of plot points of a graph corresponding to a mathematical expression including a plurality of variables, the coordinates being determined for drawing the graph on a drawing area in a screen of a display, the drawing area being defined by a plurality of coordinate ranges corresponding to a plurality of axes corresponding to the variables: specifying a minimum value and a maximum value of the drawing area in the screen of the display in a first axis of the plurality of axes, and a display pixel width along the first axis of the drawing area of the display; determining a step width of a numerical value of the first axis, based on a coordinate width along the first axis of the drawing area, and the specified display pixel width along the first axis, the coordinate width being obtained based on the specified minimum value and the specified maximum value; changing the minimum value or the maximum value of the coordinate range of the first axis of the drawing area, based on the determined step width of the numerical value of the first axis, and the minimum value or the maximum value of the coordinate range of the first axis of the drawing area; and determining, based on at least the changed minimum value or the changed maximum value of the coordinate range of the first axis, the determined step width of the numerical value of the first axis and the mathematical expression, the plurality of coordinates of the plot points of the graph, the coordinates including numerical values of the variables.

According to a third aspect of embodiments, there is provided a server apparatus in a graph drawing system including the server apparatus and a graph drawing apparatus which are mutually communicably connected via a network, the server apparatus comprising one or more processors for executing the following, for determining a plurality of coordinates of a plurality of plot points of a graph corresponding to a mathematical expression including a plurality of variables, the coordinates being determined for drawing the graph on a drawing area in a screen of a display, the drawing area being defined by a plurality of coordinate ranges corresponding to a plurality of axes corresponding to the variables: transmitting a program to the graph drawing apparatus, the program being for causing the graph drawing apparatus to execute following first process or following first to third processes; and executing following second to fourth processes or following fourth process, wherein the first process includes specifying a minimum value and a maximum value of the drawing area in the screen of the display in a first axis of the plurality of axes, and a display pixel width along the first axis of the drawing area of the display, the second process includes determining a step width of a numerical value of the first axis, based on a coordinate width along the first axis of the drawing area, and the specified display pixel width along the first axis, the coordinate width being obtained based on the specified minimum value and the specified maximum value, the third process includes changing the minimum value or the maximum value of the coordinate range of the first axis of the drawing area, based on the determined step width of the numerical value of the first axis, and the minimum value or the maximum value of the coordinate range of the first axis of the drawing area, and the fourth process includes determining, based on at least the changed minimum value or the changed maximum value of the coordinate range of the first axis, the determined step width of the numerical value of the first axis and the mathematical expression, the plurality of coordinates of the plot points of the graph, the coordinates including numerical values of the variables.

According to a fourth aspect of embodiments, there is provided a graph drawing apparatus comprising one or more processors for executing the following, for determining a plurality of coordinates of a plurality of plot points of a graph corresponding to a mathematical expression including a plurality of variables, the coordinates being determined for drawing the graph on a drawing area in a screen of a display, the drawing area being defined by a plurality of coordinate ranges corresponding to a plurality of axes corresponding to the variables: specifying a minimum value and a maximum value of the drawing area in the screen of the display in a first axis of the plurality of axes, and a display pixel width along the first axis of the drawing area of the display; determining a step width of a numerical value of the first axis, based on a coordinate width along the first axis of the drawing area, and the specified display pixel width along the first axis, the coordinate width being obtained based on the specified minimum value and the specified maximum value; changing the minimum value or the maximum value of the coordinate range of the first axis of the drawing area, based on the determined step width of the numerical value of the first axis, and the minimum value or the maximum value of the coordinate range of the first axis of the drawing area; and determining, based on at least the changed minimum value or the changed maximum value of the coordinate range of the first axis, the determined step width of the numerical value of the first axis and the mathematical expression, the plurality of coordinates of the plot points of the graph, the coordinates including numerical values of the variables.

According to a fifth of embodiments, there is provided a non-transitory recording medium having a program recorded thereon that is readable by one or more processors included in a graph drawing apparatus, the one or more processors being configured to execute the following according to the program, for determining a plurality of coordinates of a plurality of plot points of a graph corresponding to a mathematical expression including a plurality of variables, the coordinates being determined for drawing the graph on a drawing area in a screen of a display, the drawing area being defined by a plurality of coordinate ranges corresponding to a plurality of axes corresponding to the variables: specifying a minimum value and a maximum value of the drawing area in the screen of the display in a first axis of the plurality of axes, and a display pixel width along the first axis of the drawing area of the display; determining a step width of a numerical value of the first axis, based on a coordinate width along the first axis of the drawing area, and the specified display pixel width along the first axis, the coordinate width being obtained based on the specified minimum value and the specified maximum value; changing the minimum value or the maximum value of the coordinate range of the first axis of the drawing area, based on the determined step width of the numerical value of the first axis, and the minimum value or the maximum value of the coordinate range of the first axis of the drawing area; and determining, based on at least the changed minimum value or the changed maximum value of the coordinate range of the first axis, the determined step width of the numerical value of the first axis and the mathematical expression, the plurality of coordinates of the plot points of the graph, the coordinates including numerical values of the variables.

BRIEF DESCRIPTION OF THE DRAWINGS

The components in the drawings are not necessarily to scale relative to each other.

FIG. 1 is a view illustrating an example of a system according to an embodiment of the present invention.

FIG. 10 is a view exemplarily illustrating, by comparison, a conventional method and the method of the present embodiment.

FIG. 12 is a view illustrating an example of a screen display of a graphing scientific calculator.

DETAILED DESCRIPTION

Figure 2:
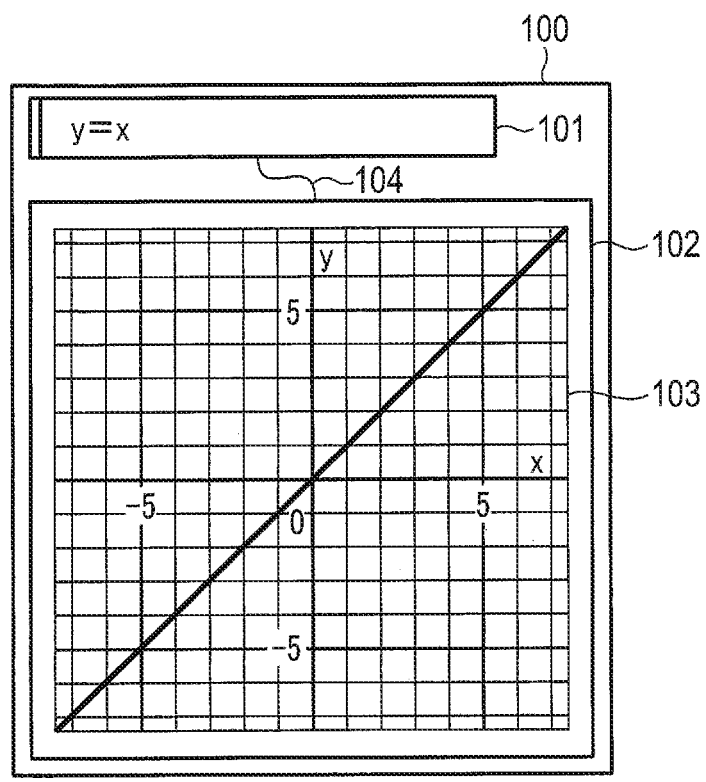
FIG. 2 is a view illustrating an example of a screen display of a terminal in the system according to the embodiment of the invention.

An embodiment of the present invention will now be described with reference to the accompanying drawing.

FIG. 1 is a view illustrating an example of a configuration of a system 1 according to an embodiment of the present invention. The system 1 includes a server 10 and a terminal 20. The server 10 and terminal 20 are communicably connected via a network 30. The network 30 is, for example, the Internet. Although FIG. 1 illustrates only one terminal 20, the number of terminals 20, which can be connected to the server 10 via the network 30, is not limited to one. One or more terminals 20 are connectable.

The system 1 displays a graph of a function by an arithmetic operation result based on a mathematical expression (function) which a user inputs. In the system 1, data, set values relating to graph drawing, and an arithmetic operation instruction, which are input to the terminal 20, are transmitted from the terminal 20 to the server 10. For example, information relating to a function, coordinates of both ends of a graph area, and a step width of plot points, which was input by the user, is transmitted to the server 10. Based on the data and arithmetic operation instruction, the server 10 executes an arithmetic operation, and transmits an arithmetic operation result (data of plot points (x, y)) to the terminal 20. The terminal 20 receives the arithmetic operation result, and displays a graph based on the arithmetic operation result.

The server 10 includes a processor 11, a ROM 12, a RAM 13, a storage 14 and a communication device 15. These components are mutually connected via a system bus 19.

The processor 11 may be an integrated circuit such as a CPU (Central Processing Unit). The ROM 12 stores information which is used in the operation of the processor 11. The RAM 13 functions as a main memory device of the processor 11. The storage 14 stores a server control program used in the processor 11, various programs such as arithmetic programs for executing various arithmetic operations, parameters, etc. The processor 11 controls the operation of the server 10 according to the programs stored in the storage 14. As the processor 11, a processor other than the CPU, for example, an ASIC (Application Specific Integrated Circuit), an FPGA (Field Programmable Gate Array) or the like, may be used. The communication device 15 can communicate with an external communication network such as the network 30.

The terminal 20 includes a CPU 21, a ROM 22, a RAM 23, a storage 24, an input device 25, a display device 26 and a communication device 27. These components are mutually connected via a system bus 29. The terminal 20 may be an electronic device such as a personal computer (PC), a tablet terminal or a smartphone.

The CPU 21 is a processor which controls various operations of the terminal 20. The ROM 22 stores a boot program, etc. The RAM 23 functions as a main memory device of the CPU 21. The storage 24 stores various programs such as a terminal control program used in the CPU 21, parameters, etc. The CPU 21 executes various programs in accordance with input signals from the input device 25 and reception signals by the communication device 27, thereby controlling the operation of the terminal 20. The various programs may be downloaded to the storage 24 from a Web server (not shown) via the network 30 and communication device 27. The communication device 27 can communicate with an external communication network such as the network 30.

The input device 25 includes an external input device such as a keyboard or a mouse, or an input board which is displayed on the display device 26 of the terminal 20. By the operation of the input device 25, an input signal is input from an input interface (I/F) to the CPU 21 via the system bus 29.

The display device 26 includes an external display device such as a liquid crystal display, or a display unit such as a liquid crystal display of the terminal 20. An output signal is transmitted to the display device 26 from the CPU 21 via the system bus 29 and an output interface (I/F).

In the present embodiment, the user designates an address of the server 10 on a Web browser which operates in the terminal 20. The Web browser of the terminal 20 issues a request to the server 10 in accordance with the acceptance of an input of a mathematical expression, and receives, as a response from the server 10, a result of an arithmetic operation which the server 10 executed according to the arithmetic program. In other words, in response to the request for an arithmetic operation from the terminal 20, the server 10 executes the arithmetic operation by the processor 11 according to the arithmetic program, and transmits the result of the executed arithmetic operation to the terminal 20 as a response. Further, using the received arithmetic operation result, the terminal 20 draws a graph according to the program which operates on the Web browser. In this manner, in the system 1, a function as a Web application for graph drawing is realized by the program that operates on the Web browser of the terminal 20 and the arithmetic program of the server 10.

Such a Web application can be utilized in a lesson of mathematics, etc., for example, in the scene of school education in which ICT (Information and Communication Technology) is advancing.

FIG. 2 is a view illustrating an example of a screen display of the display device 26. In FIG. 2, a mathematical expression tag 101 and a graph tag 102 are displayed on a window 100. The mathematical expression tag 101 is a tag which displays a mathematical expression (function) which the user inputs. The mathematical expression tag 101 is a tag to which an input from the input device 25 can be executed, and which can display the input. The graph tag 102 is a tag which displays, on a graph area (drawing area) 103 thereof, a graph of the mathematical expression (function) that is input to the mathematical expression tag 101. The graph area 103 is an area which is defined by a coordinate range of an x axis (first axis) from a minimum value xmin to a maximum value xmax, and a coordinate range of a y axis (second axis) from a minimum value ymin to a maximum value ymax. The user can properly set the graph area 103. In addition, by the user's input, parallel translation, enlargement, reduction, etc. of the graph area 103 can be performed. Since the mathematical expression tag 101 and graph tag 102 are mutually associated, the mathematical expression tag 101 and graph tag 102 are connected by a string 104 and displayed. The mathematical expression tag 101 and graph tag 102 are floating objects which can freely move in the window 100.

Hereinafter, a description is given of an example of a graph drawing operation in the system 1 at a time when a function $y=f(x)=(-1)^x$ was input to the mathematical expression tag 101.

The terminal 20 causes the display device 26 to display the window 100 including the mathematical expression tag 101 which is empty. The empty mathematical expression tag 101 is a mathematical expression tag in a state in which none of a character, a numeral, a mathematical expression, etc. is displayed. The terminal 20 accepts the user's input to the mathematical expression tag 101 with use of the input device 25. The user may input a mathematical expression to the mathematical expression tag 101 by using the keyboard of the input device 25, or may input a mathematical expression to the mathematical expression tag 101 by using a software keyboard displayed on the display device 26. The terminal 20 updates the display of the mathematical expression tag 101 in accordance with the input. If the user completes the input of a desired mathematical expression, which is, in this example, function $y=(-1)^x$, the user executes an input to finally determine the mathematical expression. This input serves as a graph drawing instruction.

Figure 3A:
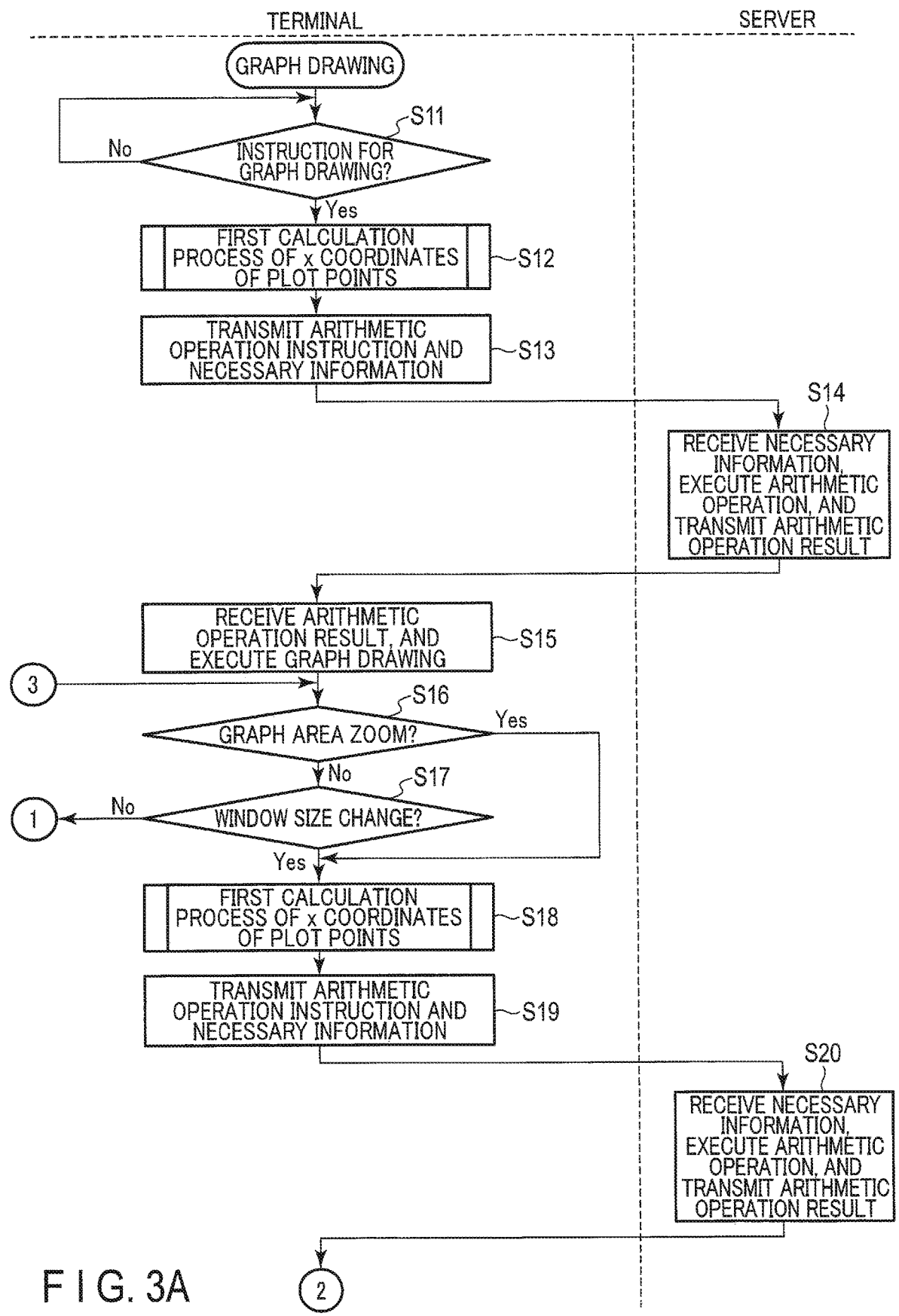
FIG. 3A is a view illustrating an example of an operation of the system according to the embodiment of the invention.
Figure 3B:
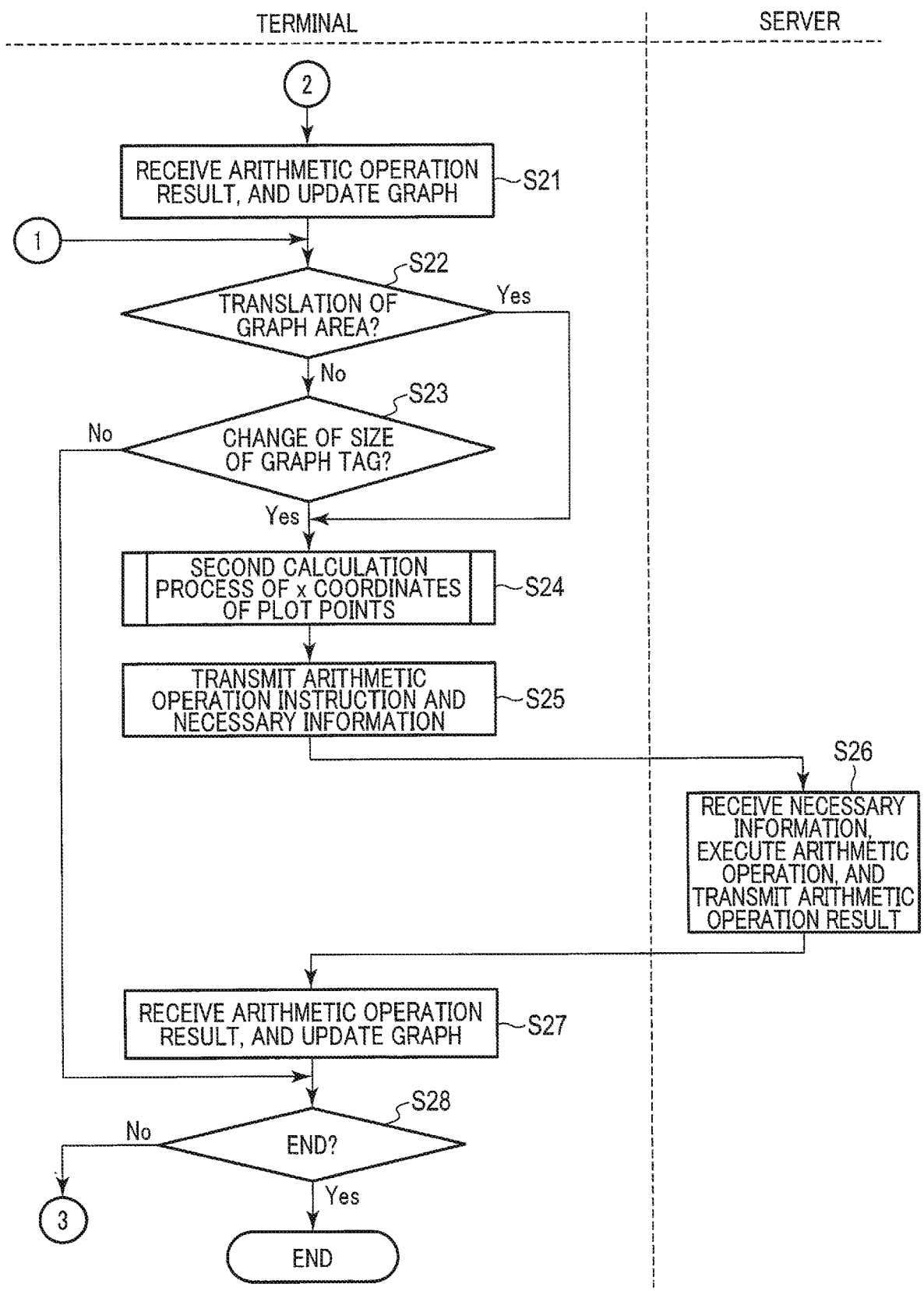
FIG. 3B is a view illustrating an example of the operation of the system according to the embodiment of the invention.

FIG. 3A and FIG. 3B are views illustrating an example of the graph drawing operation of the system 1 in the present embodiment.

In step S11, the CPU 21 determines whether the graph drawing instruction was accepted or not. The CPU 21 stands by until determining that the graph drawing instruction was accepted. When it is determined that the graph drawing instruction was accepted (Yes), the process advances to step S12.

In step S12, the CPU 21 executes a first calculation process of the x coordinates of plot points. Hereinafter, referring to FIG. 4 and FIG. 6, the first calculation process of the x coordinates of the plot points is described.

Figure 6:
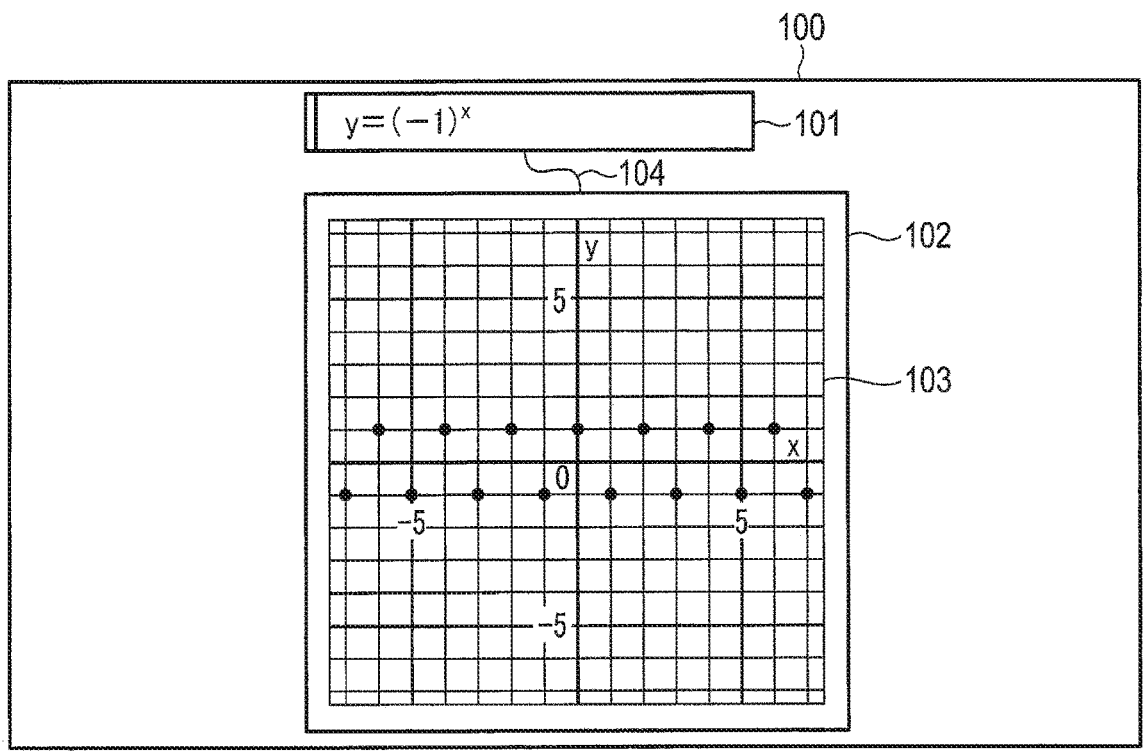
FIG. 6 is a view illustrating an example of the screen display of the terminal.

In the first calculation process of the x coordinates of plot points, in step S121, the CPU 21 specifies a minimum value xmin and a maximum value xmax of the x coordinate of the graph area 103. Here, as illustrated in FIG. 6, it is assumed that the minimum value xmin of the x coordinate=−7.28, and the maximum value xmax of the x coordinate=7.28.

In step S122, the CPU 21 specifies "xstep" which is a step value of the x coordinate. The step value xstep of the x coordinate is a step value (a step width of a numerical value) of the x coordinate for calculating plot points. In accordance with a display pixel number of a width Δx=xmax−xmin from the minimum value xmin of the x coordinate to the maximum value xmax of the x coordinate of the graph area 103, the step value xstep of the x coordinate is set at any one of step values { . . . , 0.01, 0.02, 0.05, 0.1, 0.2, 0.5, 1, 2, 5, 10, 20, 50, . . . } which are prestored, for example, in the storage 24. The step value of the x coordinate may be expressed by xstep=n×10$^m$ (m is an integer; n is a measure of 10). Aside from this, values, which satisfy n$^{-1}$×10$^m$ when the xstep is less than 1, and values, which satisfy n×10$^m$ when the xstep is 1 or more, may be independently set (n is a natural number; m is an integer). The display pixel number is a value which is determined by the specifications of the display device 26 and the actual dimensions of the graph area 103. A value of xstep, which is 1 pixel or more in pixel units and is minimum, is selected. For example, when the display pixel number is 300 pixels, Δx/display pixel number={7.28−(−7.28)}/300=0.0485333 . . . . Thus, as the value of xstep, 0.05 is selected from the above-mentioned step values.

In this manner, based on the coordinate width along the x axis of the graph area 103 and the display pixel width along the x axis of the graph area 103 of the display device 26, the step value of the x axis may be determined. At this time, the step value of the x axis may be determined such that the length of the step value on the screen of the display device 26 is greater than the length of the unit pixel along the x axis of the display device 26 on the screen of the display device 26. In addition, among the numerical values expressed by n×10$^m$ (m is an integer; n is a measure of 10), a minimum value, which is a quotient or more when the numerical value width along the x axis of the graph area 103 is divided by the display pixel number along the x axis of the graph area 103 of the display device 26, may be determined as the step value of the x axis.

The CPU 21 causes the storage 24 to store the value of xstep. Here, the CPU 21 causes the storage 24 to store information indicating that 0.05 was selected as the value of xstep.

In step S123, the CPU 21 sets a start value xstart of the x coordinate relating to plotting. Here, a value, which satisfies xstart=n·xstep, and xstart≤xmin, and is maximum, is set as the start value xstart. Specifically, the start value xstart of the x coordinate is expressed as follows.

*x*start=floor(*x*min/*x*step)·*x*step where floor is a function (floor function) for rounding down a numerical value to a closest integer. In the above example, xstart is expressed as follows.

*x*start=floor(−7.28/0.05)×0.05=−7.3.

In step S123, xstart may be calculated by using a round function instead of the floor function.

*x*start=round(*x*min/*x*step)·*x*step where round is a function for rounding off a numerical value to a designated number of digits.

In this manner, in step S123, among multiples of the step value determined in step S122, a value having a smallest difference or a second smallest difference from xmin may be found as the value of xstart.

In step S124, the CPU 21 sets an end value xend of the x coordinate relating to plotting. Here, a value, which satisfies xend=n·xstep, and xend≥xmax, and is minimum, is set as the end value xend. Specifically, the end value xend of the x coordinate is expressed as follows.

*x*end=ceil(*x*max/*x*step)·*x*step where ceil is a function (ceiling function) for rounding up a numerical value to a closest integer. In the above example, xend is expressed as follows.

*x*end=ceil(7.28/0.05)×0.05=7.3.

In step S124, xend may be calculated by using a round function instead of the ceiling function.

*x*end=round(*x*max/*x*step)·*x*step.

In this manner, in step S124, among multiples of the step value determined in step S122, a value having a smallest difference or a second smallest difference from xmax may be found as the value of xend.

After step S124, the process returns.

In step S13, the CPU 21 transmits an arithmetic operation instruction and information necessary for graph drawing to the server 10. The information necessary for graph drawing includes the input function y=(−1)$^x$, and the values of xstep, xstart and xend calculated in step S12.

In step S14, the processor 11 receives the necessary information and executes, according to the arithmetic program, an arithmetic operation of the y coordinates of plot points of graph drawing, based on the received information. Calculated coordinates (Xp, Yp) of plot points are expressed as follows.

*Xp*=*x*start+*k*·*x*step (k is an integer of 0~(xend−xstart/xstep)

*Yp*=*f*(*Xp*).

Here, Yp=f(Xp) is calculated with respect to Xp=−7.3, −7.25, −7.2, −7.15, −7.1, −7.05, −7, −6.95, . . . , 6.95, 7, 7.05, 7.1, 7.15, 7.2, 7.25, and 7.3.

In this manner, by determining the values of xstep, xstart and xend, as described above, Xp can include arbitrary integer values in the graph area, i.e. all integer values which satisfy xmin≤Xp≤xmax. Specifically, by adding a multiple of the determined step value of the x axis to a minimum value (xstart) after a change of the coordinate range of the x axis of the graph area 103 or by subtracting the multiple of the determined step value of the x axis from a maximum value (xend) after the change of the coordinate range of the x axis of the graph area 103, the minimum value or the maximum value after the change of the coordinate range of the x axis of the graph area 103 is determined such that an arbitrary integer value in the graph area 103 is obtained. Thereby, Xp can include arbitrary integer values in the coordinate range of the x axis of the graph area 103, i.e. all integer values which satisfy xmin≤Xp≤xmax.

In addition, since the function y=f(x)=(−1)$^x$ has a value only when x is an integer, the coordinates (Xp, Yp) of 15 plot points of Yp=f(−7)=−1, Yp=f(−6)=1, . . . , Yp=f(6)=1, and Yp=f(7)=−1 are calculated. Specifically, by determining the values of xstep, xstart and xend, as described above, it is possible to draw all plot points of function y=(−1)$^x$ in the graph area, i.e. in the x-coordinate range, xmin≤x≤xmax. In this manner, the coordinate values of plot points of the graph can be determined based on at least the minimum value xmin and/or maximum value xmax of the x axis of the graph area 103, the determined step value, and the mathematical expression.

The processor 11 transmits the arithmetic operation result (the above-described pairs of coordinates (Xp, Yp) of plot points) to the terminal 20.

In step S15, the CPU 21 receives the arithmetic operation result. The CPU 21 draws a graph by using the received arithmetic operation result. Thereby, as illustrated in FIG. 6, the graph of function $y=(-1)^x$ is displayed. This graph is a mathematically correct graph in which values are plotted only when x is an integer value.

Figure 8:
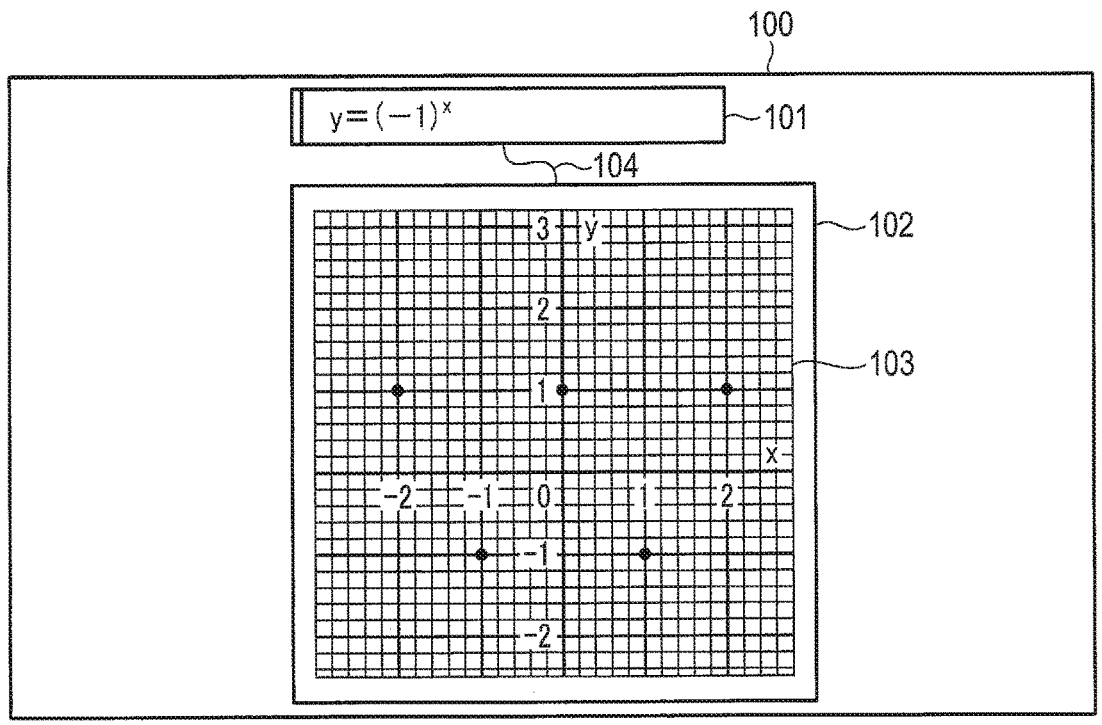
FIG. 8 is a view illustrating an example of the screen display after graph area zoom.

In step S16, the CPU 21 determines whether a zoom instruction for zoom (zoom-in (enlargement) or zoom-out (reduction)) of the graph area 103 was accepted or not. The zoom of the graph area 103 means to increase the scale values of the graph area 103, for example, as illustrated in FIG. 8, or to decrease the scale values. Specifically, in the zoom of the graph area 103, the minimum value xmin and maximum value xmax of the x coordinate of the graph area are changed. Here, a change of the sizes of the graph tag 102 and graph area 103 is not involved.

In step S16, when it is determined that the zoom instruction is not accepted (No), the process advances to step S17. When it is determined that the zoom instruction was accepted (Yes), the process advances to step S18. Specifically, when the zoom instruction was accepted, the first calculation process of the x coordinate of the plot point is executed once again in step S18, in the same manner as in step S12.

For example, as illustrated in FIG. 8, it is assumed that the minimum value xmin of the x coordinate=−2.87 and the maximum value xmax of the x coordinate=2.87 were set by the zoom-in instruction of the graph area 103. The size (display pixel number) of the graph area 103 is not changed. In this case, since Δx/display pixel number={2.87−(−2.87)}/300=0.0191333 . . . , the CPU 21 selects 0.02 as xstep from the above-mentioned step values. The CPU 21 causes the storage 24 to store information indicating that 0.02 was selected as the value of xstep. Next, the CPU 21 sets xstart=floor (−2.87/0.02)×0.02=−2.88. Further, the CPU 21 sets xend=ceil (2.87/0.02)×0.02=2.88. In this manner, in the first calculation process of the x coordinates of plot points, the value of xstep is changed from 0.05 to 0.02

In step S17, the CPU 21 determines whether a change of a window size was accepted or not. The change of the window size means that the size of the window 100 was changed in response to not a direct operation on the mathematical expression tag 101, but the execution of a user operation for changing the size of the screen on which the mathematical expression tag 101 is displayed, i.e. the size of the window of the Web application. In accordance with this, the graph tag 102 and graph area 103 are enlarged (or reduced) and the scale value of the graph area 103 is changed.

In step S17, when it is determined that the change is not accepted (No), the process advances to step S22. When it is determined that the change was accepted (Yes), the process advances to step S18. Specifically, when the change of the window size was accepted, the first calculation of the x coordinate of plot points is executed once again in step S18, in the same manner as in step S12.

If the zoom or the change of the window size of the graph 103 is executed, Δx/display pixel number changes, and it is thus necessary to re-set the value of xstep. Accordingly, in the above-described first calculation process of x coordinates of plot points, the process of calculating the value of xstep is executed.

As described above, the CPU 21 determines whether an input of an instruction (second instruction) for changing the minimum value xmin and/or the maximum value xmax in the x axis of the graph area 103, i.e. an instruction for executing the zoom or the change of the window size of the graph area 103, while involving a change of the ratio between the coordinate width along the x axis of the graph area 103 and the display pixel width along the x axis of the graph area 103, is accepted or not. When it is determined that the input of the instruction for the zoom or the change of the window size is accepted, the process advances to step S18.

After step S18, the process advances to step S19. In step S19, the CPU 21 transmits an arithmetic operation instruction and information necessary for graph drawing to the server 10. In step S20, the processor 11 receives the necessary information and executes, according to the arithmetic program, an arithmetic operation of the y coordinate of plot points of graph drawing, based on the received information. In step S21, the CPU 21 receives the arithmetic operation result. The CPU 21 draws a graph by using the received arithmetic operation result. Thereby, for example, even after the graph area 103 is zoomed, a correct graph of $y=(-1)^x$, in which values are plotted only when x is an integer value, is displayed, as illustrated in FIG. 8. Specifically, all values of y at a time when x takes an integer value are calculated with no value being skipped.

In step S22, the CPU 21 determines whether a parallel translation of the graph area 103 was accepted or not. The parallel translation of the graph area 103 means that the minimum value xmin and maximum value xmax of the x coordinate of the graph area 103 are changed without changing the size of the graph area 103. Specifically, in the parallel translation of the graph area 103, no change occurs in Δx=xmax−xmin. When it is determined that the parallel translation is not accepted (No), the process advances to step S23. When it is determined that the parallel translation was accepted (Yes), the process advances to step S24.

In step S23, the CPU 21 determines whether a change of the size of the graph tag 102 was accepted or not. The change of the size of the graph tag 102 means a change for widening or narrowing the graph tag 102, and means that at least one of the minimum value xmin and maximum value xmax of the x coordinate of the graph area 103 is changed without changing the size of the graph area 103. When it is determined that the change of the size of the graph tag 102 is not accepted (No), the process advances to step S28. When it is determined that the change of the size of the graph tag 102 was accepted (Yes), the process advances to step S24.

In other words, the CPU 21 determines whether an input of an instruction (first instruction) for changing the minimum value xmin and/or the maximum value xmax in the x axis of the graph area 103, i.e. an instruction for executing the parallel translation of the graph area 103 or the change of the size of the graph tag 102, without involving a change of the ratio between the coordinate width along the x axis of the graph area 103 and the display pixel width along the x axis of the graph area 103, is accepted or not. When it is determined that the input of the instruction for the parallel translation of the graph area 103 or the change of the size of the graph tag 102, is accepted, the process advances to step S24.

In step S24, the CPU 21 executes a second calculation process of the x coordinate of plot points. Hereinafter, referring to FIG. 5, FIG. 7 and FIG. 9, the second calculation process of the x coordinate of plot points will be described.

In the second calculation process of the x coordinate of plot points, in step S241, the CPU 21 specifies a graph area. For example, in FIG. 7, it is assumed that xmin=−4.23, and xmax=10.29. For example, in FIG. 9, it is assumed that xmin=−15.87, and xmax=15.87.

In step S242, the CPU 21 sets a start value xstart of the x coordinate relating to plotting. Here, the start value xstart of the x coordinate is expressed as xstart=floor (xmin/xstep) ·xstep. In the example illustrated in FIG. 7, xstart is expressed as follows.

xstart=floor(−4.23/0.05)×0.05=−4.3.

Figure 9:
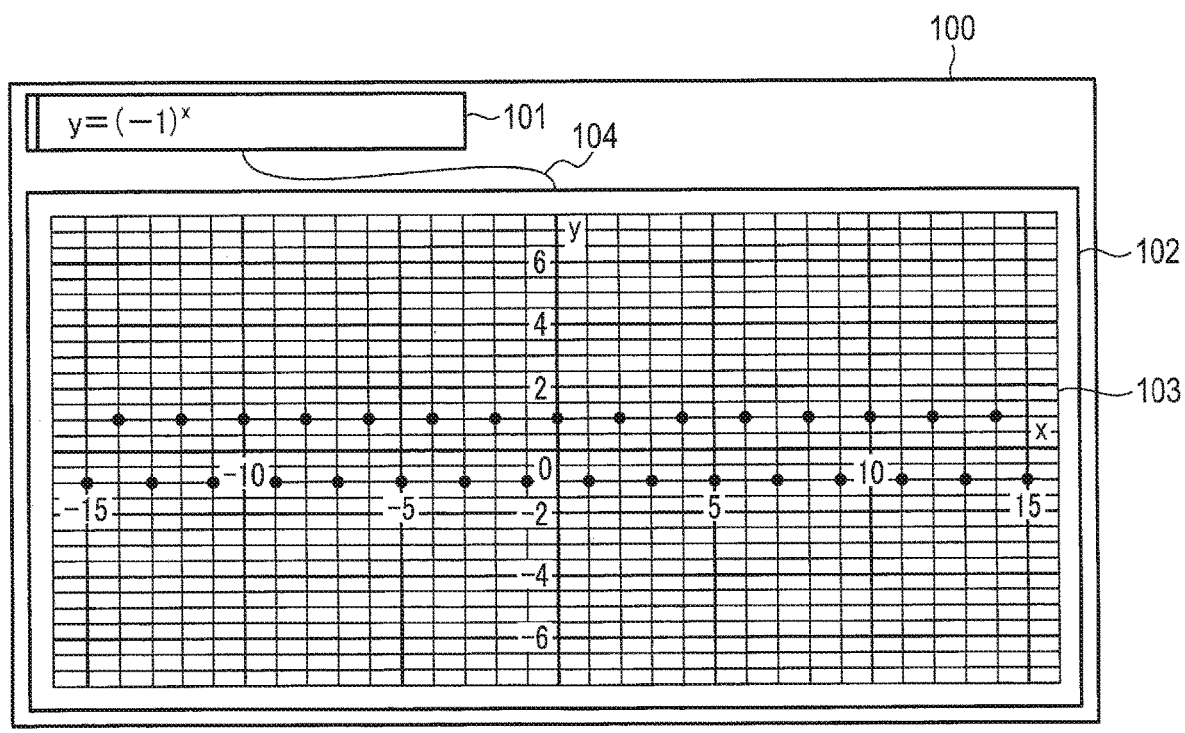
FIG. 9 is a view illustrating an example of the screen display after a size change of a graph tag.

In addition, in the example illustrated in FIG. 9, xstart is expressed as follows.

xstart=floor(−15.87/0.05)×0.05=−15.9.

In step S243, the CPU 21 sets an end value xend of the x coordinate relating to plotting. Here, the end value xend of the x coordinate is expressed as xend=ceil(xmax/xstep) ·xstep. In the example illustrated in FIG. 7, xend is expressed as follows.

xend=ceil(10.29/0.05)×0.05=10.3.

In addition, in the example illustrated in FIG. 9, xend is expressed as follows.

xend=ceil(15.87/0.05)×0.05=15.9.

After step S243, the process returns. In this manner, in the second calculation process of the x coordinate of plot points, the value of xstep remains at 0.05, and is not re-set. Even when the parallel translation of the graph area 103 or the change of the size of the graph tag 102 is executed, the Δx/display pixel number does not change. Thus, there is no need to re-set the value of xstep. Accordingly, in the above-described second calculation process of the x coordinate of plot points, the process of calculating the value of xstep is not executed.

Figure 7:
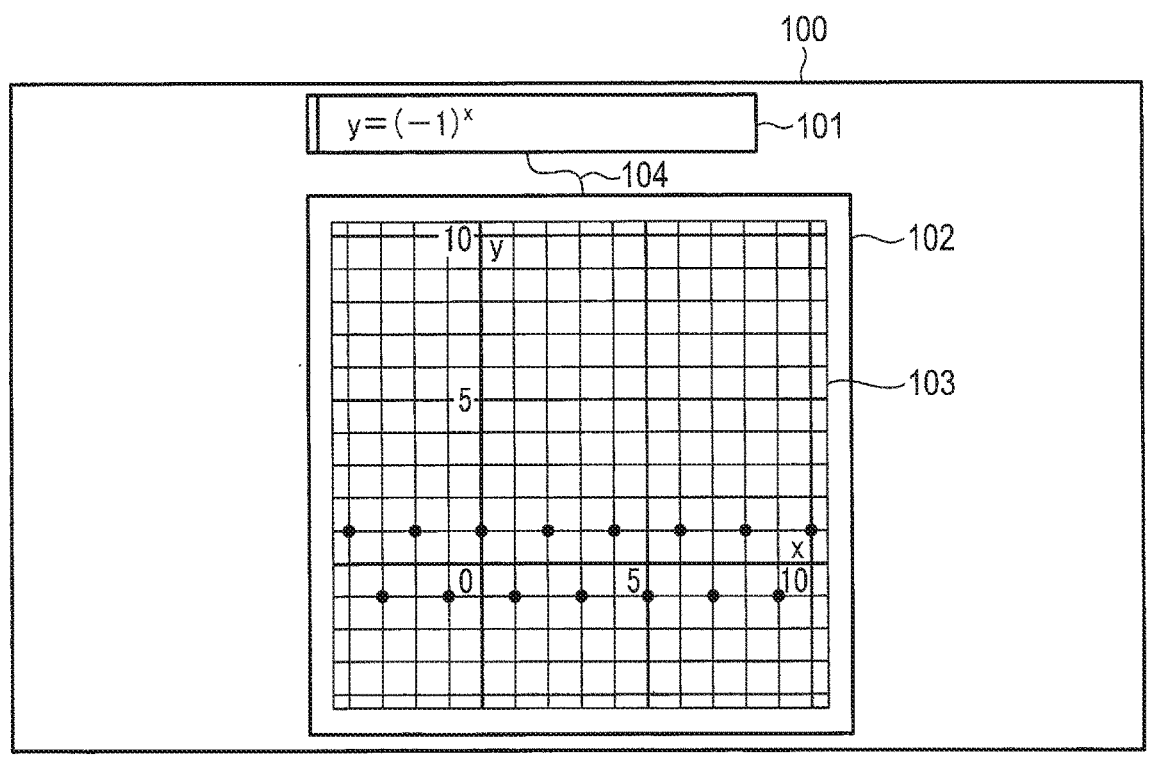
FIG. 7 is a view illustrating an example of the screen display after parallel translation of a graph area.

After step S24, the process advances to step S25. In step S25, the CPU 21 transmits an arithmetic operation instruction and information necessary for graph drawing to the server 10. The information necessary for graph drawing includes the input function y=(−1)$^x$, the values of xstart and xend calculated in step S24, and the current value of xstep stored in the storage 24. In step S26, the processor 11 receives the necessary information and executes, according to the arithmetic program, an arithmetic operation of the y coordinate of plot points of graph drawing, based on the received information. In step S27, the CPU 21 receives the arithmetic operation result. The CPU 21 updates the graph by using the received arithmetic operation result. Thereby, for example, even if the graph area 103 is parallel-translated or the size of the graph tag 102 is changed, a correct graph of y=(−1)$^x$, in which values are plotted only when x is an integer value, is displayed, as illustrated in FIG. 7 and FIG. 9. Specifically, all values of y at a time when x takes an integer value are calculated with no value being skipped.

After step S27, the process advances to step S28. In step S28, the CPU 21 determines whether the process is terminated or not. The process of step S16 onwards is repeated until it is determined that the process is terminated. When it is determined that the process is terminated (Yes), the process is terminated.

For example, in a conventional graphing scientific calculator which can draw a graph based on an input function, when a graph is drawn, the x coordinates of plot points are calculated by using set values (xmin, xmax, xdot) of the graph area, and y coordinates of the plot points are calculated from the x coordinates. Here, xdot is a step value corresponding to xstep. Concretely, the x coordinate of each plot point is expressed by a calculation formula, x=xmin+k·xdot (k is an integer). When this calculation formula is used, if xmin and xdot are rounded numerical values, there is a k, with which x becomes an integer (for example, xmin=−5, xdot=0.2).

However, when the value of x is determined according to the above calculation formula, if xmin and xdot are not rounded numerical values, there is a case where k, with which x becomes an integer, does not exist. In other words, if the value of x is determined according to the above calculation formula, there is a case where all integer values in the graph area, i.e. all integer values which satisfy xmin≤x≤xmax, are not included. For example, as illustrated in FIG. 6, when the minimum value xmin of the x coordinate=−7.28 and the maximum value xmax of the x coordinate=7.28, if xdot=0.2, the x coordinates of plot points become x=−7.28, −7.08, −6.88, . . . , 6.88, 7.08, and 7.28, and k, with which x becomes an integer, does not exist.

In particular, a graph of an x-th power of a negative integer, such as a function y=(−1)$^x$, is a graph which has a value only when x is an integer. Thus, in the case where k, with which x becomes an integer, does not exist, a graph is not correctly displayed. In particular, a mathematically incorrect graph may be drawn, or points may not plotted on a zoomed graph.

By contrast, in the present embodiment, the value of the x coordinate is determined such that the first variable (e.g., x) of the function takes an arbitrary integer value. In other words, the step value xstep of the x-coordinate range and the values of xstart and xend relating to the x coordinates of plot points are set such that the x coordinates of plot points become integers. Thereby, the value of y at a time when x takes an integer value is exactly calculated. For example, a graph of an x-th power of a negative value, such as a function y=f(x)=(−1)$^x$, can correctly be drawn, regardless of the setting of the graph area.

FIG. 10 is a view exemplarily illustrating a comparison between the setting of xmin/xmax and xdot by the above-described method of the conventional graphing scientific calculator, and the setting of xstart/xend and xstep in the present embodiment. In items in FIG. 10, "○" indicates that the value of an associated item is updated. In the present embodiment, xstart/xend, which is the newly introduced value for xmin/xmax, is updated at the times of operations of the graph area parallel translation, graph area zoom, the change of the size of the graph tag, and the change of the window size. In addition, xstep, which is the step value, is updated at the times of operations of the graph area zoom, and the change of the window size. Note that "-" in the item of the change of the window size in the conventional method means that the change of the window size is not implemented in the conventional graphing scientific calculator.

Aside from the graph of an x-th power of a negative value, there are scenes in which the exact calculation of the value of y at a time when x takes an integer value is useful. For example, when this graph drawing application is utilized in the scene of school education, for instance, in the lesson of mathematics, the user (e.g. a student) can acquire the value of y at a time when x takes an integer value, regardless of the setting of the graph area. This helps understanding of the characteristics of functions and graphs.

In the present embodiment, plot points are not calculated by arithmetic processes classified into cases in accordance with the kind of mathematical expression (function). A graph can be drawn by applying the same process to all kinds of mathematical expressions. Accordingly, there is an advantage that the amount of source code of the program for arithmetic processes does not need to be greatly increased.

As the step value xstep of the x coordinate, ⅓, for instance, may be set. In this case, ⅓=0.333 . . . . The present system is provided with a function of displaying coordinates on the graph area 103. In this case, the length of coordinate display in the decimal display setting may become large. If ½, ¼, ⅕, ⅒, or the like is set as xstep, the length of coordinate display may be short. In addition, in the case in which thick lines of the grid of the graph area 103 are at intervals of 1, 2, or 5, if xstep is set at $n^{-1} \times 10^m$ when xstep is less than 1, and if xstep is set at $n \times 10^m$ when xstep is 1 or more (m is an integer; n is a measure of 10), coordinate points on thick lines of the grid are always displayed.

In the above description, the graph drawing was exemplified in which the data (x, y) of plot points, which is the arithmetic operation result from the server 10, is plotted on the graph area 103. Alternatively, the data (x, y) of plot points may be displayed as a numerical table on the display device 26 of the terminal 20. For example, a numerical table tag, which displays the numerical table, may be displayed on the window 100.

Figure 11A:
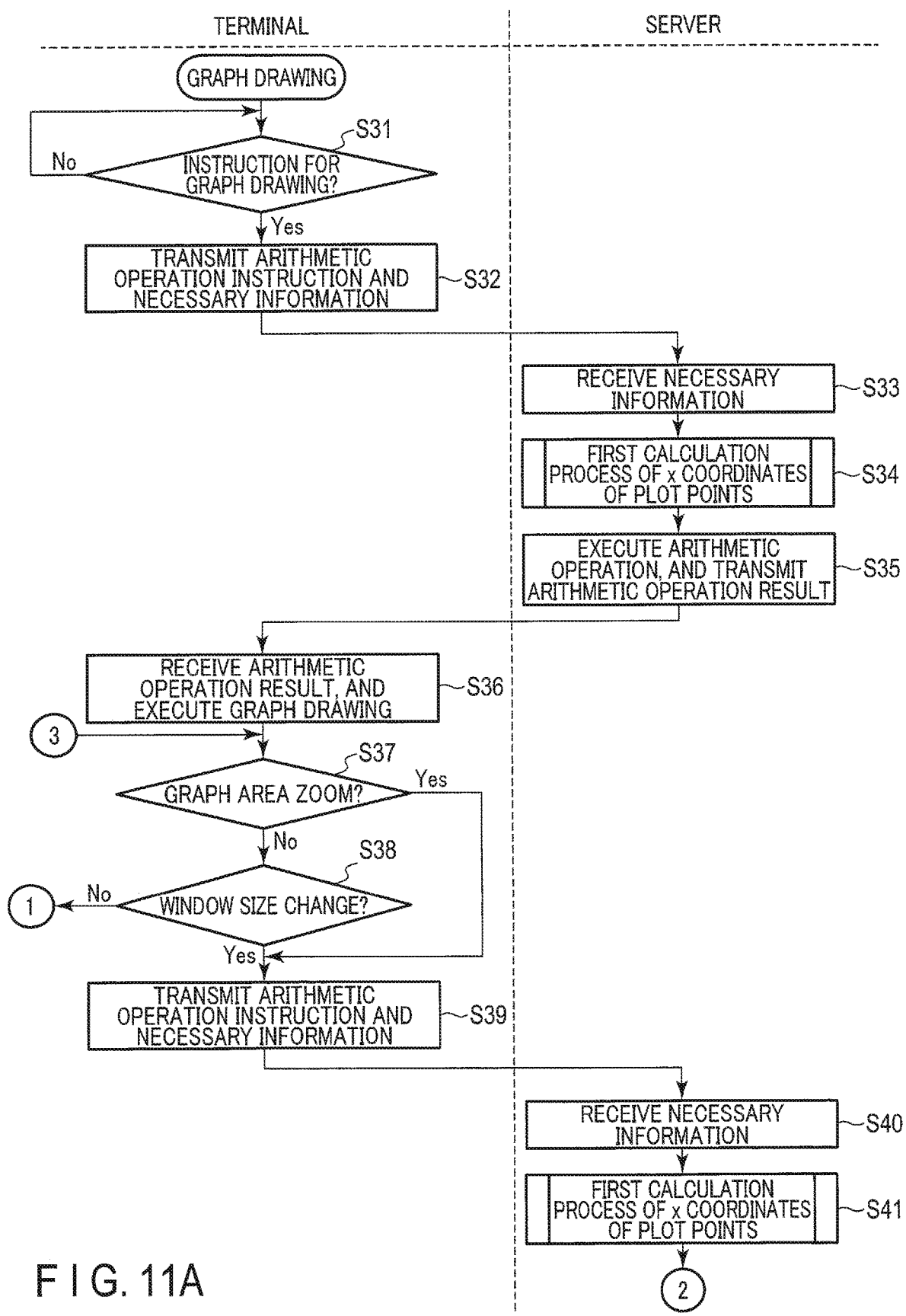
FIG. 11A is a view illustrating an example of an operation of a system according to another embodiment of the present invention.
Figure 11B:
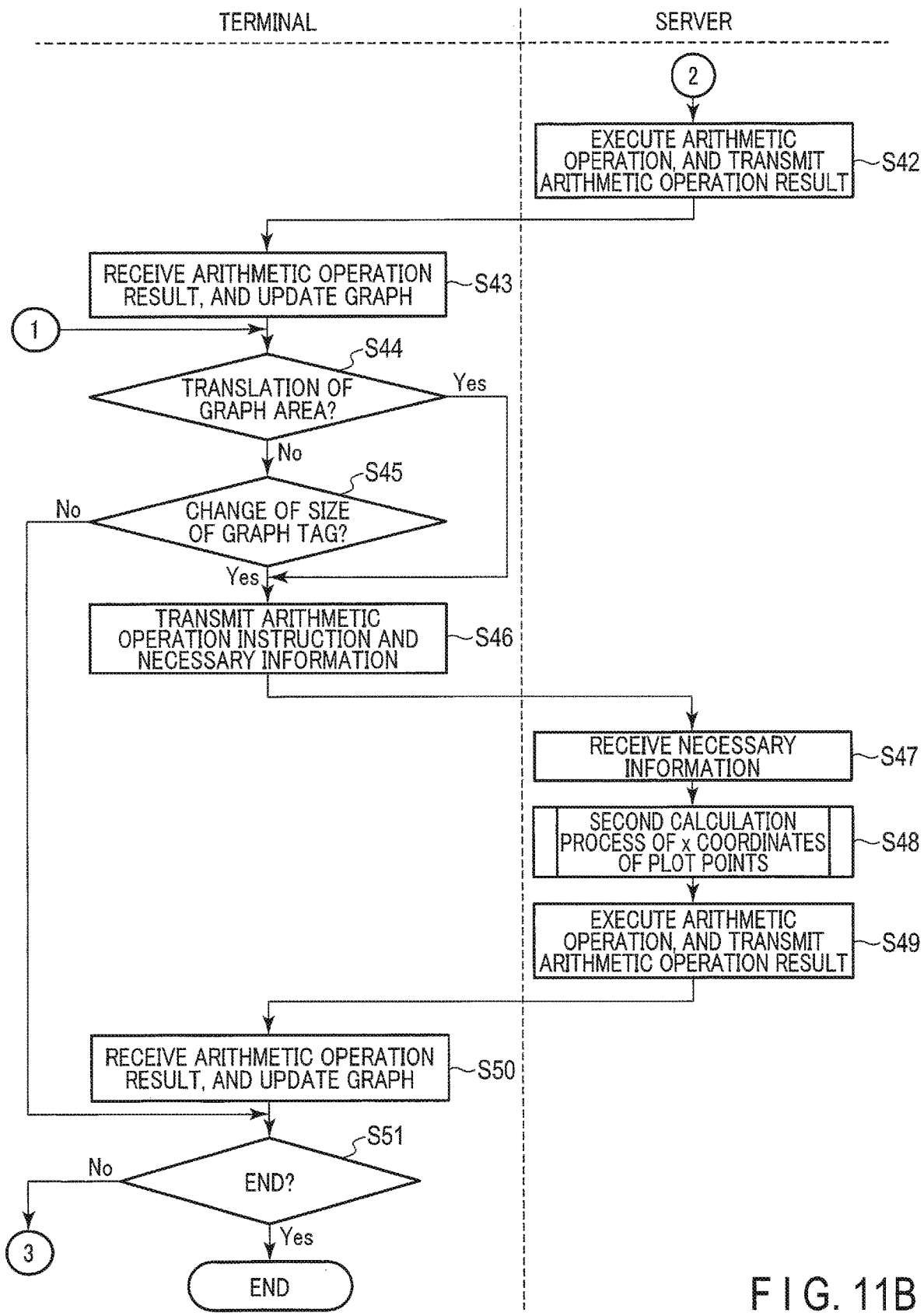
FIG. 11B is a view illustrating an example of the operation of the system according to the another embodiment of the invention.

The description has been given above of the embodiment in which the calculation process of the x coordinates of plot points is executed in the terminal 20. However, this process may be executed in the server 10. FIG. 11A and FIG. 11B illustrate an example of a graph drawing operation of the system 1 in such another embodiment.

In step S31, the CPU 21 determines whether a graph drawing instruction was accepted or not. The CPU 21 stands by until determining that the graph drawing instruction was accepted. If the CPU 21 determines that the graph drawing instruction was accepted (Yes), the process advances to step S32.

In step S32, the CPU 21 transmits an arithmetic operation instruction and information necessary for graph drawing to the server 10. The information necessary for graph drawing includes the information of the input function and graph area.

Figure 4:
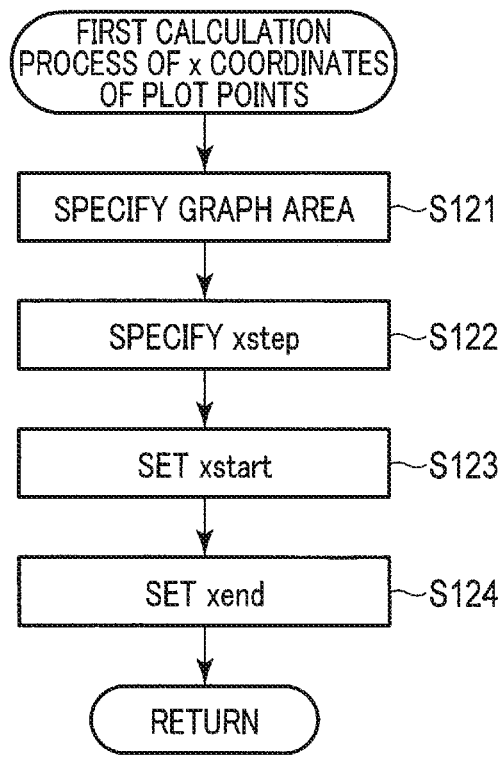
FIG. 4 is a view illustrating an example of a first calculation process of x coordinates of plot points.

In step S33, the processor 11 receives the necessary information. In step S34, the processor 11 executes a first calculation process of the x coordinates of plot points. That is, the same process as illustrated in FIG. 4 is executed. In step S35, the processor 11 executes an arithmetic operation of the y coordinates of plot points of graph drawing, based on the arithmetic program, the input function and the values of xstep, xstart and xend calculated in step S34. The processor 11 transmits the arithmetic operation result to the terminal 20.

In step S36, the CPU 21 receives the arithmetic operation result. The CPU 21 draws a graph by using the received arithmetic operation result.

In step S37, the CPU 21 determines whether a zoom instruction of the graph area 103 was accepted or not. When it is determined that the zoom instruction is not accepted (No), the process advances to step S38. When it is determined that the zoom instruction was accepted (Yes), the process advances to step S39.

In step S38, the CPU 21 determines whether a change of a window size was accepted or not. When it is determined that the change is not accepted (No), the process advances to step S44. When it is determined that the change was accepted (Yes), the process advances to step S39.

In step S39, the CPU 21 transmits an arithmetic operation instruction and information necessary for graph drawing to the server 10. In step S40, the processor 11 receives the necessary information. In step S41, the processor 11 executes a first calculation process of the x coordinates of plot points. That is, the same process as illustrated in FIG. 4 is executed. In step S42, the processor 11 executes an arithmetic operation of the y coordinates of plot points of graph drawing, based on the arithmetic program, the input function and the values of xstep, xstart and xend calculated in step S41. The processor 11 transmits the arithmetic operation result to the terminal 20.

In step S43, the CPU 21 receives the arithmetic operation result. The CPU 21 draws a graph by using the received arithmetic operation result.

In step S44, the CPU 21 determines whether a parallel translation of the graph area 103 was accepted or not. When it is determined that the parallel translation is not accepted (No), the process advances to step S45. When it is determined that the parallel translation was accepted (Yes), the process advances to step S46.

In step S45, the CPU 21 determines whether a change of the size of the graph tag 102 was accepted or not. When it is determined that the change of the size of the graph tag 102 is not accepted (No), the process advances to step S51. When it is determined that the change of the size of the graph tag 102 was accepted (Yes), the process advances to step S46.

Figure 5:
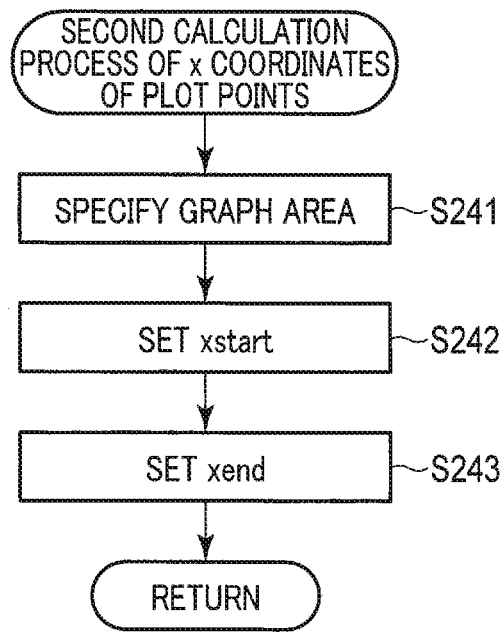
FIG. 5 is a view illustrating an example of a second calculation process of x coordinates of plot points.

In step S46, the CPU 21 transmits an arithmetic operation instruction and information necessary for graph drawing to the server 10. In step S47, the processor 11 receives the necessary information. In step S48, the processor 11 executes a second calculation process of the x coordinates of plot points. That is, the same process as illustrated in FIG. 5 is executed. In step S49, the processor 11 executes an arithmetic operation of the y coordinates of plot points of graph drawing, based on the arithmetic program, the input function, the values of xstart and xend calculated in step S48, and the current value of xstep stored in the storage 24. The processor 11 transmits the arithmetic operation result to the terminal 20.

In step S50, the CPU 21 receives the arithmetic operation result. The CPU 21 updates the graph by using the received arithmetic operation result.

After step S50, the process advances to step S51. In step S51, the CPU 21 determines whether the process is terminated or not. The process of step S37 onwards is repeated until it is determined that the process is terminated. When it is determined that the process is terminated (Yes), the process is terminated.

In the above, the Web application was described in which the program that operates on the Web browser of the terminal 20 and the arithmetic program of the server 10 cooperate. However, the above-described concept of graph drawing is applicable to fields other than the Web application. For example, this concept is applicable to a graph drawing algorithm in an electronic device such as a graphing scientific calculator. FIG. 12 is a view illustrating an example of a display screen of a graphing scientific calculator 50. On the graphing scientific calculator 50, a mathematical expression input area 51 corresponding to the mathematical expression tag 101 and a graph drawing area 52 corresponding to the graph area 103 of the graph tag 102 are displayed. In this graphing scientific calculator 50, the operation as illustrated in FIG. 3A and FIG. 3B or in FIG. 11A and FIG. 11B may be realized by internal processing by a CPU (not shown) or the like of the graphing scientific calculator 50, without requiring the above-described communication between the terminal 20 and server 10.

The present invention is not limited to the above-described embodiments, and can be variously modified without departing from the scope of the present invention in practical stages. The embodiments may be appropriately combined as much as possible and practiced and, in this case, the combined advantageous effects can be obtained. Furthermore, the above-described embodiments incorporate inventions of various stages, and various inventions can be extracted by appropriate combinations of the disclosed constituent elements. For example, even if some constituent elements are omitted from all the constituent elements disclosed in the embodiments, a configuration from which some constituent elements are omitted can be extracted as an invention if the problem described in the specification is solved and the advantageous effects described in the specification can be obtained.

What is claimed is:

1. A method executed by a graph drawing system including a plurality of apparatuses which are mutually communicably connected via a network,
    the method comprising executing the following, for determining a plurality of coordinates of a plurality of plot points of a graph corresponding to a mathematical expression including a plurality of variables, the coordinates being determined for drawing the graph on a drawing area in a screen of a display, the drawing area being defined by a plurality of coordinate ranges corresponding to a plurality of axes corresponding to the variables:
    specifying a minimum value and a maximum value of the drawing area in the screen of the display in a first axis of the plurality of axes, and a display pixel width along the first axis of the drawing area of the display;
    determining a step width of a numerical value of the first axis, based on a coordinate width along the first axis of the drawing area, and the specified display pixel width along the first axis, the coordinate width being obtained based on the specified minimum value and the specified maximum value;
    changing the minimum value or the maximum value of the coordinate range of the first axis of the drawing area, based on the determined step width of the numerical value of the first axis, and the minimum value or the maximum value of the coordinate range of the first axis of the drawing area; and
    determining, based on at least the changed minimum value or the changed maximum value of the coordinate range of the first axis, the determined step width of the numerical value of the first axis and the mathematical expression, the plurality of coordinates of the plot points of the graph, the coordinates including numerical values of the variables.

2. The method of claim 1, wherein the changing the minimum value or the maximum value of the coordinate range of the first axis of the drawing area includes:
    changing the minimum value of the coordinate range of the first axis of the drawing area to, among multiples of the determined step width of the numerical value of the first axis, a value having a smallest difference or a second smallest difference from the minimum value of the coordinate range of the first axis of the drawing area, or changing the maximum value of the coordinate range of the first axis of the drawing area to, among the multiples of the determined step width of the numerical value of the first axis, a value having a smallest difference or a second smallest difference from the maximum value of the coordinate range of the first axis of the drawing area.

3. The method of claim 1, wherein the changing the minimum value or the maximum value of the coordinate range of the first axis of the drawing area includes:
    determining, by adding a multiple of the determined step width of the numerical value of the first axis to a minimum value after a change of the coordinate range of the first axis of the drawing area or by subtracting the multiple of the determined step width of the numerical value of the first axis from a maximum value after the change of the coordinate range of the first axis of the drawing area, the minimum value or the maximum value after the change of the coordinate range of the first axis of the drawing area, such that an arbitrary integer value in the drawing area is obtained.

4. The method of claim 1, wherein the determining the step width of the numerical value of the first axis includes:
    determining the step width of the numerical value of the first axis such that a length of the step width on the screen of the display becomes greater than a length of a unit pixel along the first axis of the display on the screen of the display.

5. The method of claim 1, wherein the determining the step width of the numerical value of the first axis includes:
    determining, among numerical values expressed by $n \times 10^m$ (m is an integer; n is a measure of 10), a minimum value, which is a quotient or more when the coordinate width along the first axis of the drawing area is divided by the specified display pixel width along the first axis, as the step width of the numerical value of the first axis.

6. The method of claim 1, further comprising executing:
    determining whether an input of (i) a third instruction for changing the coordinate range set in the drawing area such that the coordinate range is parallel-translated or (ii) a fourth instruction for changing a size of the drawing area is accepted or not; and
    when it is determined that the input of the third instruction or the fourth instruction is accepted,
    determining, without determining the step width of the numerical value of the first axis, the plurality of coordinates of the plot points of the graph, based on at least the step width of the numerical value of the first axis, which step width is determined before the change of the minimum value or the maximum value, the minimum value or the maximum value of the first axis of the drawing area after the change of the minimum value or the maximum value, and the mathematical expression.

7. The method of claim 1, further comprising executing:
    determining whether an input of (i) a fifth instruction for enlarging or reducing the coordinate range set in the drawing area or (ii) a sixth instruction for changing a size of a window, which is displayed in the screen of the display and on which the drawing area is displayed, is accepted or not; and
    when it is determined that the input of the fifth instruction or the sixth instruction is accepted,
    determining the step width of the numerical value of the first axis, and
    determining the plurality of coordinates of the plot points of the graph, based on at least the determined step width of the numerical value of the first axis, the minimum value or the maximum value of the first axis of the drawing area after the change of the minimum value or the maximum value, and the mathematical expression.

8. The method of claim 1, further comprising executing:
determining whether an input of a first instruction for changing the minimum value or the maximum value in the first axis of the drawing area, without involving a change of a ratio between the coordinate width along the first axis of the drawing area and the display pixel width along the first axis of the drawing area, is accepted or not; and
when it is determined that the input of the first instruction is accepted,
determining, without determining the step width of the numerical value of the first axis, the plurality of coordinates of the plot points of the graph, based on at least the step width of the numerical value of the first axis, which step width is determined before the change of the minimum value or the maximum value, the minimum value or the maximum value of the first axis of the drawing area after the change of the minimum value or the maximum value, and the mathematical expression.

9. The method of claim 1, further comprising executing:
determining whether an input of a second instruction for changing the minimum value or the maximum value in the first axis of the drawing area, while involving a change of a ratio between the coordinate width along the first axis of the drawing area and the display pixel width along the first axis of the drawing area, is accepted or not; and
when it is determined that the input of the second instruction is accepted,
determining the step width of the numerical value of the first axis, and
determining the plurality of coordinates of the plot points of the graph, based on at least the determined step width of the numerical value of the first axis, the minimum value or the maximum value of the first axis of the drawing area after the change of the minimum value or the maximum value, and the mathematical expression.

10. A graph drawing system including a plurality of apparatuses which are mutually communicably connected via a network,
the graph drawing system comprising a plurality of processors each of which is included in any one of the plurality of apparatuses and which are configured to execute the following, for determining a plurality of coordinates of a plurality of plot points of a graph corresponding to a mathematical expression including a plurality of variables, the coordinates being determined for drawing the graph on a drawing area in a screen of a display, the drawing area being defined by a plurality of coordinate ranges corresponding to a plurality of axes corresponding to the variables:
specifying a minimum value and a maximum value of the drawing area in the screen of the display in a first axis of the plurality of axes, and a display pixel width along the first axis of the drawing area of the display;
determining a step width of a numerical value of the first axis, based on a coordinate width along the first axis of the drawing area, and the specified display pixel width along the first axis, the coordinate width being obtained based on the specified minimum value and the specified maximum value;
changing the minimum value or the maximum value of the coordinate range of the first axis of the drawing area, based on the determined step width of the numerical value of the first axis, and the minimum value or the maximum value of the coordinate range of the first axis of the drawing area; and
determining, based on at least the changed minimum value or the changed maximum value of the coordinate range of the first axis, the determined step width of the numerical value of the first axis and the mathematical expression, the plurality of coordinates of the plot points of the graph, the coordinates including numerical values of the variables.

11. A server apparatus in a graph drawing system including the server apparatus and a graph drawing apparatus which are mutually communicably connected via a network, the server apparatus comprising one or more processors for executing the following, for determining a plurality of coordinates of a plurality of plot points of a graph corresponding to a mathematical expression including a plurality of variables, the coordinates being determined for drawing the graph on a drawing area in a screen of a display, the drawing area being defined by a plurality of coordinate ranges corresponding to a plurality of axes corresponding to the variables:
transmitting a program to the graph drawing apparatus, the program being for causing the graph drawing apparatus to execute following first process or following first to third processes; and
executing following second to fourth processes or following fourth process, wherein
the first process includes specifying a minimum value and a maximum value of the drawing area in the screen of the display in a first axis of the plurality of axes, and a display pixel width along the first axis of the drawing area of the display,
the second process includes determining a step width of a numerical value of the first axis, based on a coordinate width along the first axis of the drawing area, and the specified display pixel width along the first axis, the coordinate width being obtained based on the specified minimum value and the specified maximum value,
the third process includes changing the minimum value or the maximum value of the coordinate range of the first axis of the drawing area, based on the determined step width of the numerical value of the first axis, and the minimum value or the maximum value of the coordinate range of the first axis of the drawing area, and
the fourth process includes determining, based on at least the changed minimum value or the changed maximum value of the coordinate range of the first axis, the determined step width of the numerical value of the first axis and the mathematical expression, the plurality of coordinates of the plot points of the graph, the coordinates including numerical values of the variables.

12. A graph drawing apparatus comprising one or more processors for executing the following, for determining a plurality of coordinates of a plurality of plot points of a graph corresponding to a mathematical expression including a plurality of variables, the coordinates being determined for drawing the graph on a drawing area in a screen of a display, the drawing area being defined by a plurality of coordinate ranges corresponding to a plurality of axes corresponding to the variables:
specifying a minimum value and a maximum value of the drawing area in the screen of the display in a first axis of the plurality of axes, and a display pixel width along the first axis of the drawing area of the display;

determining a step width of a numerical value of the first axis, based on a coordinate width along the first axis of the drawing area, and the specified display pixel width along the first axis, the coordinate width being obtained based on the specified minimum value and the specified maximum value;

changing the minimum value or the maximum value of the coordinate range of the first axis of the drawing area, based on the determined step width of the numerical value of the first axis, and the minimum value or the maximum value of the coordinate range of the first axis of the drawing area; and determining, based on at least the changed minimum value or the changed maximum value of the coordinate range of the first axis, the determined step width of the numerical value of the first axis and the mathematical expression, the plurality of coordinates of the plot points of the graph, the coordinates including numerical values of the variables.

13. A non-transitory recording medium having a program recorded thereon that is readable by one or more processors included in a graph drawing apparatus, the one or more processors being configured to execute the following according to the program, for determining a plurality of coordinates of a plurality of plot points of a graph corresponding to a mathematical expression including a plurality of variables, the coordinates being determined for drawing the graph on a drawing area in a screen of a display, the drawing area being defined by a plurality of coordinate ranges corresponding to a plurality of axes corresponding to the variables:

specifying a minimum value and a maximum value of the drawing area in the screen of the display in a first axis of the plurality of axes, and a display pixel width along the first axis of the drawing area of the display;

determining a step width of a numerical value of the first axis, based on a coordinate width along the first axis of the drawing area, and the specified display pixel width along the first axis, the coordinate width being obtained based on the specified minimum value and the specified maximum value;

changing the minimum value or the maximum value of the coordinate range of the first axis of the drawing area, based on the determined step width of the numerical value of the first axis, and the minimum value or the maximum value of the coordinate range of the first axis of the drawing area; and determining, based on at least the changed minimum value or the changed maximum value of the coordinate range of the first axis, the determined step width of the numerical value of the first axis and the mathematical expression, the plurality of coordinates of the plot points of the graph, the coordinates including numerical values of the variables.

* * * * *